United States Patent [19]

Takanashi

[11] 4,301,485
[45] Nov. 17, 1981

[54] TAPE SPEED SWITCHING DEVICE IN CASSETTE TAPE RECORDER-PLAYER

[75] Inventor: Hiroyoshi Takanashi, Hamamatsu, Japan

[73] Assignee: Nippon Gakki Seizo Kabushiki Kaisha, Shizuoka, Japan

[21] Appl. No.: 102,940

[22] Filed: Dec. 12, 1979

[30] Foreign Application Priority Data

Dec. 21, 1978 [JP] Japan ............................ 53-177165[U]

[51] Int. Cl.³ ...................... G11B 15/00; G11B 17/00
[52] U.S. Cl. .................................... 360/96.5; 360/137
[58] Field of Search ................ 360/69, 73, 96.1, 96.5, 360/92, 93, 132, 137; 242/197–200

[56] References Cited

U.S. PATENT DOCUMENTS

| | | | |
|---|---|---|---|
| 3,867,722 | 2/1975 | Syohji | 360/96.6 |
| 4,176,383 | 11/1979 | Suzuki | 360/137 X |
| 4,215,377 | 7/1980 | Norris | 360/96.1 |

*Primary Examiner*—John H. Wolff
*Attorney, Agent, or Firm*—Darby & Darby

[57] ABSTRACT

A tape speed switching device in a cassette tape recorder capable of selecting a tape transport speed for recording and playback among a plurality of different speeds, comprises a cassette ejecting mechanism and a tape speed switching mechanism which are mechanically coupled to each other. The tape speed switching mechanism is operated in association with the operation of the cassette ejecting mechanism, so that the tape speed is set to a predetermined one every time when the ejecting mechanism is operated.

11 Claims, 3 Drawing Figures

Fig.2

TAPE SPEED SWITCHING DEVICE IN CASSETTE TAPE RECORDER-PLAYER

BACKGROUND OF THE INVENTION

This invention relates to devices for changing tape speeds from one to another in cassette tape recorder-players (hereinafter referred to as merely "cassette tape recorders") capable of selecting a recording and/or playback speed of tape transport from a plurality of different speeds, and more specifically to a tape speed device in such a cassette tape recorder, in which the tape speed is set to one predetermined tape speed when a cassette holder or housing is released by a cassette ejecting mechanism to cause a tape cassette receiving space to be accessible. A desired tape speed among a plurality of tape speeds provided for the cassette tape recorder is selected by the operation of a speed switching member only when the cassette holder is set at its predetermined operating position.

Cassette tape recorders having a plurality of recording and/or playback tape speeds are known in the art. It is also known in the art that selection of a suitable one among these plural tape speeds results in making recording or reproducing signals excellent in quality with the recording or reproducing time determined accordingly, i.e., a relatively high speed will allow recording and reproducing performance in high fidelity with recording sources.

In a conventional cassette tape recorder of this type, the tape speed switching mechanism is provided completely independently of the cassette ejecting mechanism; i.e., these two mechanism work separately. However, in a cassette tape recorder, the recording and playback speed is generally standardized to be 4.75 centimeters per second. Therefore, with the conventional cassette tape recorder of multi-speed, it is necessary to check what the set tape speed is (of which of, for instance, the standard speed, the high speed and the low speed has been set) whenever a cassette is loaded in the cassette tape recorder for recording or reproducing. This is undoubtedly troublesome for the operator of the cassette tape recorder.

SUMMARY OF THE INVENTION

In view of the foregoing, this invention is intended to improve a tape speed switching device in a cassette tape recorder so that the cassette tape recorder can be operated more readily than a conventional one.

More specifically, a first object of this invention is to provide a tape speed switching device for a cassette tape recorder, in which the tape speed is set to a predetermined one by operating a cassette ejecting mechanism.

A second object of the invention is to provide a tape speed switching device for a cassette tape recorder, it is unnecessary to check what the tape speed is after the ejecting mechanism is operated.

A third object of the invention is to provide a tape speed switching device for a cassette tape recorder, in which, after the cassette holder is set at its predetermined operating position, a desired tape speed can be selected out of a plurality of tape speeds provided for the cassette tape recorder.

A fourth object of the invention is to provide a tape speed switching device for a cassette tape recorder, which is simple in construction and can be manufactured at low cost.

The tape speed switching device according to the invention comprises: a cassette ejection mechanism for causing a cassette holder to be released so that a tape cassette receiving portion is accessible for loading and unloading a tape cassette, and a tape speed switching mechanism for selecting a tape transport speed from a plurality of speeds wherein both mechanisms are coupled with each other so that the ejection mechanism dominates the operation of the switching mechanism. More specifically the invention may comprise; a cassette ejecting mechanism having an ejecting lever and first through third links which are operated in association with the ejecting lever; and a tape speed switching mechanism having a switching operation lever, an intermediate rotary lever, and fourth and fifth links, the two mechanisms being mechanically coupled to each other. When the ejecting lever is operated, the first through third links are operated thereby, so that the cassette holder is released. At the same time, the fifth link is disengaged from the fourth link, as a result of which the fourth link is moved by elastic means to operate a change-over switch thereby to set the tape speed to a predetermined one. After the cassette holder is set at its predetermined operating position, one end portion of the fifth link is engaged with one of plural grooves formed in the edge portion of the fourth link by operating the switching operation lever, as a result of which the change-over switch can be operated to set the tape speed to a required one.

Thus, simultaneously when the cassette holder is released by operating the ejecting lever in order to replace the cassette, the tape speed switching mechanism is automatically operated by the elastic means, whereby the tape speed is set to the predetermined one. Furthermore, among a plurality of tape speeds provided for the cassette tape recorder, a desired one can be selected by operating the switching operation lever after the cassette holder is set at the predetermined operating position.

The nature, utility and principle of the invention will become more apparent from the following detailed description and the appended claims when read in conjunction with the accompanying drawings, in which like parts are designated by like reference numerals or characters.

BRIEF DESCRIPTION OF THE DRAWINGS

In the accompanying drawings:

FIG. 2 is also an explanatory diagram of the tape speed switching device shown in FIG. 1, with the cassette holder released from the predetermined operating position.

DETAILED DESCRIPTION OF THE PREFERRED EMBODIMENT

Figure 1:
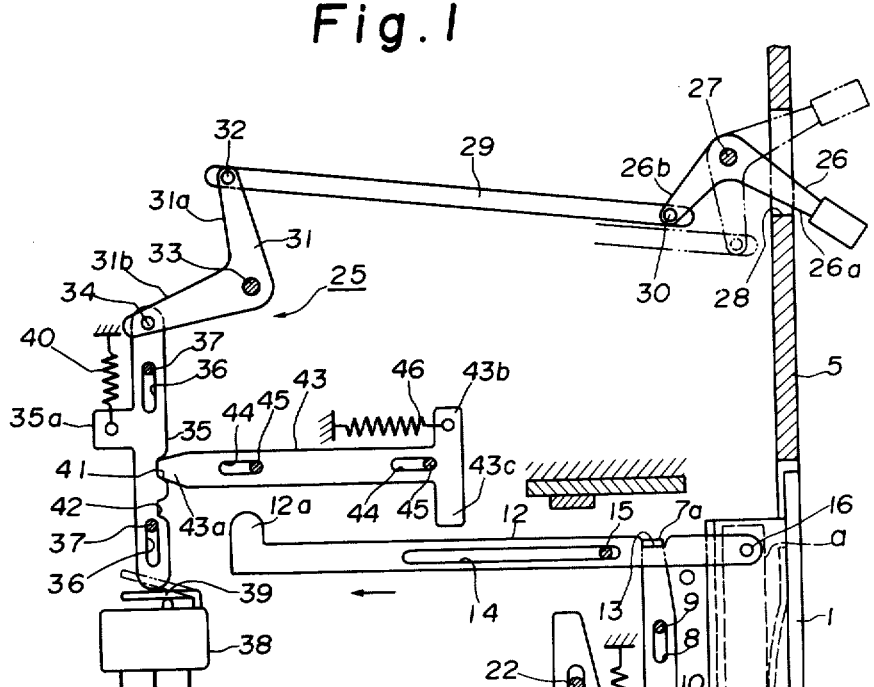
FIG. 1 is an explanatory diagram showing an arrangement of one example of a tape speed switching device provided for a cassette tape recorder according to this invention, with a cassette holder set at its predetermined operating position.
Figure 2:
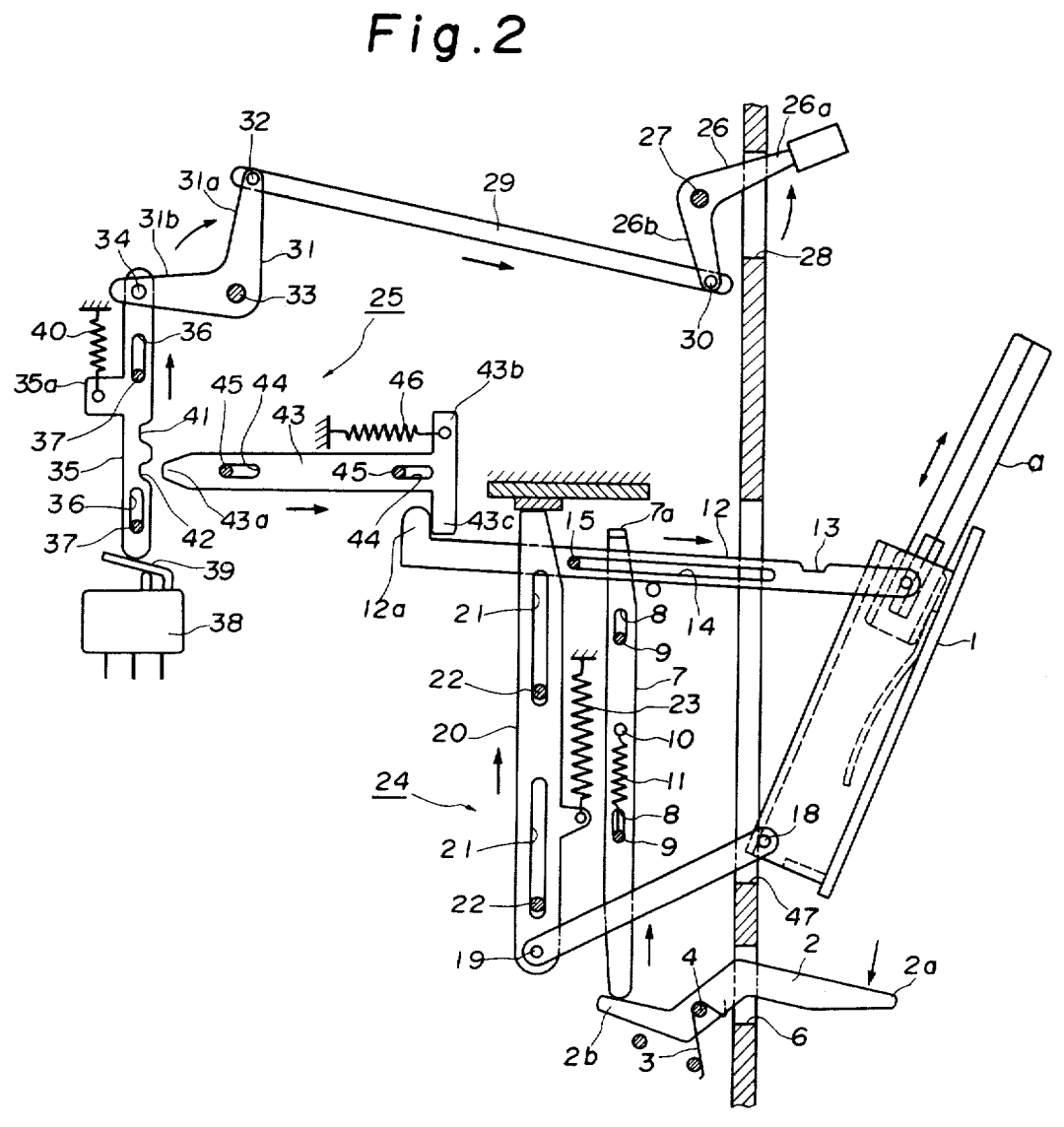

In FIGS. 1 and 2, reference numeral 1 designates a cassette holder in which a tape cassette a is loaded, and reference numeral 2 designates an ejecting lever to eject the cassette holder 1. The ejecting lever 2 being biased counterclockwise by a spring 3 is rotatably supported on a stationary pin 4. That is, the ejecting lever 2 can be turned by operating its right end portion 2a with the finger, which is protruded outside through a hole 6 in a front panel 5. The stationary pin 4 is embedded in a chassis (not shown), and other stationary pins (described later) are also embedded in the chassis. A link 7 is disposed on the left end portion 2b of the ejecting lever 2, so that it is moved up and down by the ejecting lever 2.

The link 7 has elongated holes 8 and 8 into which stationary pins 9 and 9 are inserted, respectively, so that the link 7 is movable vertically. A pin 10 is embedded in the middle portion of the link 7. The link 7 is energized downwardly by a spring 11 connected between the pin 10 and the lower stationary pin 9. The lower end of the link 7 abuts against the upper surface of the left end portion 2b of the ejecting lever 2 at all times, while the bent portion 7a which is formed on the upper end of the link 7 is engaged with an engaging groove or recess 13 provided in a link 12.

The link 12 is movable back and forth (horizontally in the figures) by being guided by a stationary pin 15 inserted into an elongated hole 14 formed in the link 12. The front end portion of the link 12 is rotatably mounted on a pin 16 on the upper end portion of one side of the cassette holder 1 so that the link 12 moves following the movement of the cassette holder 1.

Thus, the cassette holder 1 is supported by the link 12 at the upper end portion of the side, and it is further supported by an auxiliary link 17 at the lower end portion of the same side. One end portion of the auxiliary link 17 is rotatably mounted through a pin 18 on the lower end portion of the side of the cassette holder 1, while the opposite end portion of the auxiliary link 17 is rotatably coupled through a pin 19 to the lower end portion of a link 20. The link 20 has elongated holes 21 and 21 into which stationary pins 22 are inserted, respectively. Thus, the link 20 is movable vertically be being guided by the pins 22; however, it is energized upwardly by a spring 23 connected between the chassis and a protrusion 20a formed in the middle portion of the link 20.

Thus, a cassette ejecting mechanism 24 is made up of the above-described lever, links and springs.

In FIGS. 1 and 2, reference numeral 25 designates a tape speed switching mechanism which provides a plurality of tape speeds selectively, and reference numeral 26 designates the operating lever of the mechanism 25. The operating lever 26 is L-shaped, and the bent portion thereof is rotatably mounted on a stationary pin 27, and the right end portion 26a is protruded outside through a hole 28 in the front panel 5. The operating lever is turned around the pin 27 by operating the right end portion 26a. The right end portion of an auxiliary link 29 is rotatably coupled through a pin 30 to the left end portion 26b of the operating lever 26, while the left end portion of the auxiliary link 29 is also rotatably coupled through a pin 32 to the upper end portion 31a of an intermediate rotary lever 31.

The intermediate rotary lever 31 is also L-shaped, and the bent portion thereof is rotatably mounted on a stationary pin 33. The left end portion 31b of the lever 31 is rotatably coupled through a pin 34 to the upper end portion of a link 35 so that the movement of the auxiliary link 29 due to the movement of the operating lever 26 engages the vertical movement of the link 35.

The link 35 has elongated holes 36 and 36 into which stationary pins 37 and 37 are inserted, respectively so as to guide the link 35 vertically. The lower end of the link 35 is in contact with the actuator 39 of a change-over switch 38. The link 35 is energized upwardly by a spring 40 connected between the chassis and a protrusion 35a provided at the middle portion of the link 35. The link 35 further has grooves (or recesses) 41 and 42 formed in the right edge portion thereof with which the left end portion 43a of a link 43 can be engaged selectively.

The link 43 has elongated holes 44 and 44 into which stationary pins 45 and 45 are inserted so as to guide the link 43 back and forth (or horizontally in the figure). The link 43 is energized towards the link 35 by a spring 46 extended between the chassis and a protrusion 43b provided on the right end of the link 43.

When the left end portion 43a of the link 43 is engaged with the engaging grooves 41 or 42, the link 35 is locked at a predetermined upper or lower position. One of the predetermined upper or lower position of the link 35 is selected by operating the operating lever 26 which in turn moves the auxiliary link 29 and the intermediate rotary lever 31. The elastic force of the spring 46 is greater than that of the spring 40. Therefore, the left end portion 43a of the link 43 will not be disengaged from the engaging groove 41 or 42 by the elastic force of the spring 40.

When the cassette holder 1 is released from the opening 47 of the front panel 5, the link 12 rotatably mounted on the pin 16 is moved forward (right in the figure) following the forward movement of the cassette holder 1. In this operation, a protrusion 12a formed at the left end of the link 12 is engaged with the protrusion 43c of the link 43, as a result of which the left end portion 43a of the link 43 is disengaged from the engaging groove 41 or 42.

Figure 3:
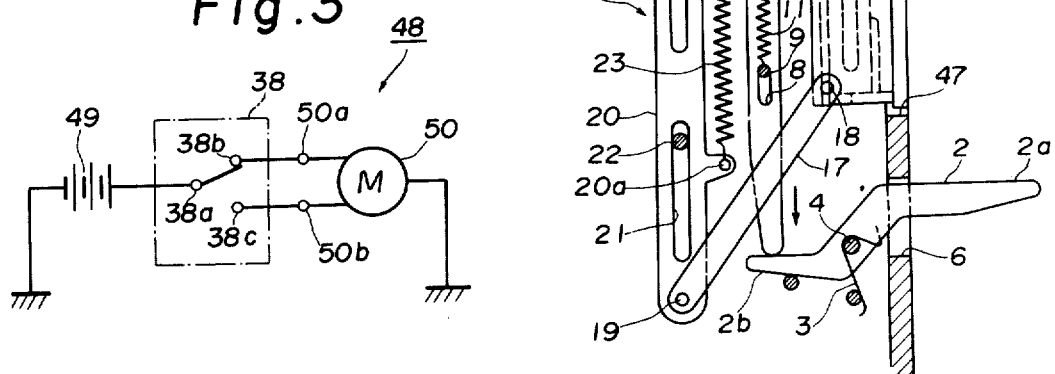
FIG. 3 is a circuit diagram showing the electrical drive circuit of the tape running system in the cassette tape recorder.

The electrical circuit of the change-over switch 38, as shown in FIG. 3, is inserted in the electrical drive circuit 48 of the tape running system. When the upper position of the link 35 is changed to the lower position or vice versa, the armature connected to the contact 38a is tripped from the contact 38b over to the contact 38c, or vice versa. When the change-over switch 38 is operated, a power source 49 is selectively connected to one of the input terminals 50a and 50b of a multi-speed electric motor 50 which is adapted to drive the reel drive shaft (not shown) and the capstan (not shown), as a result of which the motor 50 is rotated at the selected one of two speeds preset for the motor; that is, two tape speeds are provided for a recording and playback seed of the tape transport.

In this example, when the operating lever 26 is set at the position shown in FIG. 2 (or indicated by the two-dot chain line in FIG. 1), i.e., when the operating lever 26 is set at the upper position, the auxiliary link 29 is moved forward (to the right in FIGS. 1 or 2), the intermediate rotary lever 31 is rotated clockwise, and the link 35 is set at the upper position and accordingly the actuator 39 of the switch 38 is lifted, the tape speed is set at the standard speed. On the other hand, when the operating lever 26 is set at the position indicated by the solid line in FIG. 1, i.e., when the operating lever 26 is set at the lower position, the auxiliary link 29 is moved backward (to the left in FIG. 1), the intermediate rotary lever 31 is rotated counterclockwise, the link 35 is set at the lower position, and accordingly the actuator 39 of the switch 38 is depressed, the tape speed is set at a high (or low) speed.

The operation of the tape speed switching device thus organized will be described.

FIG. 1 shows a state of the device in which the cassette holder 1 is inserted into the opening section 47 by being depressed in the direction of the arrows. Under this condition, the magnetic tape in the cassette a loaded in the cassette holder 1 can be subjected to recording or reproducing operation. Furthermore, the link 20 is moved downwardly against the elastic force of the spring 23, the link 12 is moved backward by the backward pushing of the cassette holder 1 via the pin 16 (to the left in the figure), and the bent portion 7a of the link 7 is engaged with the groove 13, thus being locked as shown in FIG. 1.

Under this condition, the protrusion 12a of the link 12 is spaced a predetermined distance from the protrusion 43c of the link 43, and accordingly the left end portion 43a of the link 43 can engage with the engaging groove 41 or 42. Therefore, the tape speed can be set to a desired one by operating the operating lever 26 and thereby changing the vertical position of the link 35 determined by the actuation of the intermediate rotary lever 31 due to the movement of the auxiliary link 29 and accordingly the position of the actuator 39 of the switch 38.

As was described before, FIG. 1 shows the state of the tape speed switching device, in which the tape speed has been set to the high (or low) speed. That is, the end portion 26a of the operating lever 26 is maintained depressed (downwardly), the left (or rear) end portion 43a of the link 43 is engaged with the upper engaging groove 41 of the link, and accordingly the link 35 is maintained at the lower position.

When, under the above-described condition, the cassette a is ejected, for instance, to replace it, then the tape speed is set to the standard speed.

When the end portion 2a of the ejecting lever 2 is turned clockwise, the link 7 is lifted by the opposite end portion 2b of the ejecting lever 2 against the elastic force of the spring 11, as a result of which the bent portion 7a of the link 7 is disengaged from the engaging groove 13 of the link 12, as shown in FIG. 2. In consequence, the cassette holder 1 can be disengaged from the opening 47. More specifically, as the link 20 is moved upwardly by the spring 23, the cassette holder 1 is moved outside the opening 47 by means of the link 17 which is operated by the upward movement of the link 20. Thus, the cassette a can be replaced.

As the link 12 is moved forward (to the right following the movement of the cassette holder 1), the protrusion 12a of the link 12 engages the engaging portion 43c of the link 43 to move the latter 43 forward against the elastic force of the spring 46. As a result, the rear (left) end portion 43a of the link 43 is disengaged from the engaging groove 41 of the link 35. Accordingly, the link 35 is moved upwardly by the elastic force of the spring, and simultaneously the operating lever 39 of the change-over switch is lifted, so that the tape speed is changed to the standard speed. In this operation, in association with the link 35 the intermediate rotary lever 31 is turned clockwise and simultaneously the auxiliary link 29 is moved forward, so that the operating lever 26 is turned counterclockwise to move its end portion 26a upwardly. If, in the above-described ejecting operation, the tape speed has been set to the standard speed in advance, then the standard speed is maintained unchanged.

As is apparent from the above description, even if the tape speed is set to any of the standard speed and the high (or low) speed in the cassette tape recorder before the ejecting operation is carried out, the standard speed is set by the ejecting operation. In other words, no matter what speed is set before the ejecting operation is conducted, the standard speed is set up by the ejecting operation at all times. Thus, if the cassette ejecting mechanism is operated to load a desired tape cassette in advance to the recording and/or playback operation, the user is not required to pay any attention as to the tape speed of the cassette tape recorder as for as he intends to use the recorder at the standard speed. Therefore, it is unnecessary to check if the tape speed is set to the standard speed whenever the cassette is replaced. It should be noted that, when the cassette holder 1 is inserted into the opening section 47 after the loading of the tape cassette a, the cassette holder 1 may be pushed backward until the bent portion 7a of the link 7 is engaged with the groove 13 of the link 12 which is moved following the movement of the cassette holder 1 via the pin 16.

In the above-described example, the tape speed is changed in two steps; however, it should be noted that the invention is not limited thereto or thereby. That is, according to the invention, more than two tape speeds can be provided, and in this case also a predetermined one of the tape speeds is set every time when a cassette is re-loaded.

What is claimed is:

1. A tape speed switching device in a cassette tape recorder-player capable of selecting a tape transport speed for recording and playback among a plurality of different speeds, one of which is a standard speed, the device comprising:
   a holder for containing a tape cassette;
   means for moving said cassette holder between a locked position and an open position;
   multi-position switch means for energizing an electrical drive circuit to move the tape in the cassette at a selected one of said plurality of speeds when the holder is in its locked position; and
   means operably interconnecting said switch and said moving means to set said switch to effect said standard tape speed when the cassette holder is moved from its locked position to said open position.

2. The tape speed switching device of claim 1 in which said moving means comprises:
   a trigger lever for opening said cassette holder;
   a first link movable in one direction by the operation of said trigger lever;
   a second link connected at one end to said cassette holder to be movable with said holder, and having a protrusion at its other end, said first link releasably engaging said second link when said cassette holder is in its locked position to inhibit movement of said second link; and
   a third link coupled to said cassette holder and biased to urge said cassette holder to its open position when said first link is moved in said one direction to release said second link.

3. The tape speed switching device of claim 2, in which said switch means comprises:
   a fourth link selectively movable among a plurality of switch positions each of which corresponds to one of said plurality of tape speeds, and being biased to one of said switch positions corresponding to said standard a fifth link which is movably supported and has one end portion releasably engageable with said fourth link at each of a plurality of locations, each of said locations corresponding to one of said switch positions, the other end portion of said fifth link being engageable with said protrusion of said second link when said cassette holder is moved to its open position, thereby to disengage said fifth link from said fourth link to permit the bias in said fourth line to move said fourth link to said one switch position corresponding to said standard tape speed.

4. A device as claimed in claim 3, in which said first link has one end portion abutted against one end portion of said trigger lever, and the other end portion having a bent portion which is engageable with said second link, said first link being energized in a direction opposite to said one direction by elastic means coupled thereto.

5. The tape speed switching device of claim 4 in which said second link comprises an engaging groove adapted to receive the bent portion of said first link when the cassette holder is in its locked position.

6. A device as claimed in claim 3, in which said fourth link is biased by elastic means coupled thereto, and said fifth link is energized toward said fourth link by elastic means coupled to said fifth link.

7. A device as claimed in claim 6, in which the biasing force of said elastic means coupled to said fourth link is so selected that when said fourth link is disengaged from said fifth link, said fourth link moves to said one position corresponding to said standard tape speed.

8. A device as claimed in claim 7, in which the energizing force of said elastic means adapted to energize said fifth link is greater than that of said elastic means adapted to bias said fourth link.

9. A device as claimed in claim 3, in which said one end portion of said fifth link, which is adapted to engage with said fourth link, is tapered and rounded.

10. The tape speed switching device of claim 9 in which said fourth link comprises an engaging groove at each of said locations, the configuration of each of said grooves coinciding with that of said one end portion of said fifth link.

11. A device as claimed in claim 3, in which said fourth link is actuated by an intermediate rotary lever, an auxiliary lever, and a switching operation lever, said intermediately rotary lever having one end portion rotatably mounted on the upper end portion of said fourth link, said auxiliary lever being interconnected between the other end portion of said intermediate rotary lever and one end portion of said switching operation member, respectively.

* * * * *